(12) United States Patent
Pi et al.

(10) Patent No.: US 11,684,879 B2
(45) Date of Patent: Jun. 27, 2023

(54) WATER PURIFIER AND FILTER CARTRIDGE DEVICE THEREOF

(71) Applicant: Freudenberg Apollo Filtration Technologies Co., Ltd., Guangdong (CN)

(72) Inventors: Xiaochun Pi, Guangdong (CN); Kunyuan He, Guangdong (CN); Kaihua Xuan, Guangdong (CN)

(73) Assignee: Freudenberg Apollo Filtration Technologies Co., Ltd., Foshan (CN)

( * ) Notice: Subject to any disclaimer, the term of this patent is extended or adjusted under 35 U.S.C. 154(b) by 275 days.

(21) Appl. No.: 17/040,536

(22) PCT Filed: Mar. 25, 2019

(86) PCT No.: PCT/CN2019/079579
§ 371 (c)(1),
(2) Date: Sep. 22, 2020

(87) PCT Pub. No.: WO2019/184887
PCT Pub. Date: Oct. 3, 2019

(65) Prior Publication Data
US 2021/0023485 A1    Jan. 28, 2021

(30) Foreign Application Priority Data

Mar. 26, 2018 (CN) .......................... 201810253059.X
Mar. 26, 2018 (CN) .......................... 201810254660.0
Aug. 22, 2018 (CN) .......................... 201810962436.7

(51) Int. Cl.
*B01D 35/30* (2006.01)
*B01D 29/15* (2006.01)
*C02F 1/00* (2023.01)

(52) U.S. Cl.
CPC ............. *B01D 35/30* (2013.01); *B01D 29/15* (2013.01); *C02F 1/001* (2013.01);
(Continued)

(58) Field of Classification Search
CPC ................ B01D 25/30; B01D 2201/29; B01D 2201/291; B01D 2201/302;
(Continued)

(56) References Cited

U.S. PATENT DOCUMENTS

| | | | |
|---|---|---|---|
| 8,746,003 B2 * | 6/2014 | Yoon | B01D 35/153 62/190 |
| 2007/0284296 A1 * | 12/2007 | Swain | B01D 35/153 210/235 |

(Continued)

FOREIGN PATENT DOCUMENTS

| | | |
|---|---|---|
| CN | 104128037 A | 11/2014 |
| CN | 204727626 U | 10/2015 |
| CN | 206295689 U | 7/2017 |

*Primary Examiner* — Benjamin M Kurtz

(57) ABSTRACT

A filter cartridge device is disclosed, which includes a water stopping assembly (13) and automatic water locking assemblies (22); wherein the water stopping assembly (13) can control water supply or water cut-off of the filter cartridge device, and prevent residual water inside a filter cavity (111) from flowing out during the process of detaching the filter cartridge device; the automatic water locking assemblies (22) can control water supply or water cut-off between the filter cartridge device and an external pipe, and prevent water inside the external pipe from flowing out during the process of detaching the filter cartridge device; and the water stopping assembly (13) controls water supply or water cut-off of on its side. In addition, a water purifier comprising the filter cartridge device is also disclosed.

23 Claims, 11 Drawing Sheets

(52) U.S. Cl.
CPC .... *B01D 2201/295* (2013.01); *B01D 2201/34* (2013.01); *B01D 2201/4076* (2013.01); *C02F 2201/004* (2013.01); *C02F 2201/006* (2013.01)

(58) Field of Classification Search
CPC ........ B01D 2201/301; B01D 2201/347; B01D 2201/4076; B01D 2201/4015; C02F 1/003; C02F 2201/004; C02F 2201/006
See application file for complete search history.

(56) References Cited

U.S. PATENT DOCUMENTS

2012/0228206 A1\* 9/2012 Kim ..................... C02F 9/005
   210/232
2018/0304181 A1\* 10/2018 Prince ................... F25D 23/126

\* cited by examiner

WATER PURIFIER AND FILTER CARTRIDGE DEVICE THEREOF

TECHNICAL FIELD

The present invention relates to the field of filter cartridge technologies, and in particular, to a water purifier and a filter cartridge device thereof.

BACKGROUND

As water purifiers become increasingly popular, consumers have growing requirements for the product experience, and they are most interested in filter cartridge devices that automatically seals water during detachment.

In the prior art, there are various filter cartridge devices capable of automatically sealing water, which mainly include the following technologies:

1. Water stopping valves are disposed in a filter cartridge device to realize water supply or water cut-off;
2. A rotation structure is disposed at an end of a filter cartridge device to supply or cut off water through undocking; and
3. A rotation structure is disposed in the filter base to supply or cut off water through undocking.

In the first technology, the number of the water stopping valves increases with the increased number of the water inlets and outlets in the filter cartridge device, which makes the assembly of the filter cartridge device more complicated, and further leads to low production efficiency and high cost.

In the second technology, the rotation structure at the end of the filter cartridge device is fastened by screws, and the torque of the screws is difficult to control, which makes it difficult to balance the compression amount of a sealing ring provided in the rotating structure and the rotating feel, and may bring a hidden trouble of water leakage.

In the third technology, the arrangement of the rotation structure in the filter base will complicate the structure of the filter base and increase the assembly difficulty.

In addition to the above defects, the existing filter cartridge devices also have disadvantages such as water channeling, incomplete filtration, and complicated disassembly and assembly operations.

SUMMARY

In order to solve the above technical problems, the present invention provides a water purifier and a filter cartridge device thereof. The filter cartridge device adopts a two-way sealing structure, which can completely eliminate water leakage during disassembly and assembly. In addition, the operations of supplying or cutting off water are simple, and the assembly structure is simplified, rendering users with good hand handle.

A filter cartridge device includes a housing, a filter medium, and a water stopping assembly, wherein the housing has a filter cavity, the filter medium is disposed in the filter cavity, and filter channels are formed in the filter cavity;

a first opening that communicates with the filter cavity is disposed on a first end of the housing, and the water stopping assembly comprises a water retaining member and a water dividing member that can rotate relative to each other, the water retaining member is disposed in the first opening and can rotate relative to the housing, the water dividing member is disposed in the filter cavity and is connected to the water retaining member through a rotating shaft structure, the water dividing member can rotate together with the housing, and the filter medium is connected to an end of the water dividing member away from the water retaining member;

the water dividing member has water dividing channels and water dividing member docking ports that communicate with the water dividing channels; the water retaining member has water retaining channels and water retaining member docking ports that communicate with the water retaining channels; and the water dividing member docking ports and the water retaining member docking ports are controlled to be docked or undocked through relative rotation of the water dividing member and the water retaining member, to connect or disconnect the water dividing channels and the water retaining channels; and the water dividing member also has water dividing member water inlets-outlets, and the water dividing channels communicate with the filter channels through the water dividing member water inlets-outlets; and the water retaining member also has water retaining member water inlets-outlets that communicate with the water retaining channels.

Preferably, the rotating shaft structure comprises a rotating shaft and a shaft hole, the rotating shaft is connected to one end of the water dividing member through a connecting rod, the water dividing member docking ports are disposed on a side wall of the rotating shaft, the shaft hole is disposed on one end of the water retaining member, the water retaining member docking ports are disposed on a side wall of the shaft hole, and the rotating shaft is inserted into the shaft hole so that the water dividing member is rotatably connected with the water retaining member.

Preferably, a sealing member is disposed between the rotating shaft and the shaft hole, the outer side wall of the rotating shaft is provided with a clamping slot for the sealing member to be clipped into, and the sealing member forms sealed cells around the water dividing member docking ports.

Preferably, the sealing member comprises two first ribs and a plurality of second ribs connected between the first ribs, and two adjacent second ribs and the two first ribs form the sealed cells.

Preferably, the first rib has a ring shape or is a long strip that can be formed into a ring.

Preferably, the water dividing member docking ports are located in the respective sealed cells.

Preferably, at least one sealed cell is provided between any two adjacent water dividing member docking ports.

Preferably, a partition is disposed close to the first opening at an inner side wall of the housing; the partition and the inner side wall of the housing form an installation position, and the first opening is an installation port for the installation position; the water retaining member is installed in the installation position; the water dividing member is disposed at a side of the partition away from the water retaining member; a through hole is disposed in a center of the partition, and the rotating shaft passes through the through hole and is rotatably connected to the shaft hole.

Preferably, first protruding blocks are disposed on a side surface of the partition facing the water retaining member, first sliding slots corresponding to the first protruding blocks are disposed in an end of the water retaining member facing the partition, and the first protruding blocks and the first sliding slots constitute a sliding position-limiting structure.

Preferably, relationships between the sliding position-limiting structure and the water stopping assembly are as follows:

When the first protruding blocks slide to first ends of the first sliding slots with rotation of the housing, the water dividing member docking ports and the water retaining member docking ports are fully docked; and When the first protruding blocks slide to second ends of the first sliding slots with the rotation of the housing, the water dividing member docking ports and the water retaining member docking ports are fully undocked.

Preferably, the filter cartridge device further comprises a base provided with a cavity, the first end of the housing is screwed into the cavity, grooves are provided in a bottom of the cavity, protruding pillars are disposed on an end of the water retaining member away from the water dividing member, and the protruding pillars are inserted into the grooves to limit rotation of the water retaining member; and Base channels are provided at the bottom of the grooves; water retaining member water inlets-outlets are arranged in top ends of the protruding pillars; automatic water locking assemblies are disposed in the grooves; and the protruding pillars are controlled through relative rotation of the housing and the base to open or close the automatic water locking assemblies, thereby connecting or disconnecting the water retaining channels and the base channels.

Preferably, the grooves are stepped grooves, each of which comprises a first-step slot and a second-step slot; the base channels are disposed at bottoms of the second-step slots; the automatic water locking assembly comprises a spring, a water sealing plug, and a water sealing sleeve; the water sealing sleeves are disposed in the first-step slots, the water sealing plugs are disposed in the water sealing sleeves, the springs are disposed in the second-step slots and press against the water sealing plugs; and the protruding pillars are inserted into the water sealing sleeves and press off the water sealing plugs.

Preferably, second sliding slots are disposed in an inner side wall of the base, the second sliding slots extend to an opening edge of the cavity, and the opening edge of the cavity is provided with sliding ports for the second sliding slots, the outer side wall of the housing is provided with second protruding blocks corresponding to the second sliding slots, and the second protruding blocks and the second sliding slots constitute a rotary connection structure.

Preferably, wherein relationships between the rotary connection structure and the water stopping assembly are as follows:

When the second protruding blocks slide to innermost ends of the second sliding slots with rotation of the housing, the water dividing member docking ports and the water retaining member docking ports are fully docked; and When the second protruding blocks slide out of the second sliding slots through the sliding ports with the rotation of the housing, the water dividing member docking ports and the water retaining member docking ports are fully undocked.

Preferably, the base channels comprise a first water inlet channel and a first water outlet channel, the grooves have the same quantity as the base channels and correspond to the base channels one to one; the protruding pillars comprise water inlet protruding pillars and water outlet protruding pillars, the water inlet protruding pillar extends into the groove in which the first water inlet channel is located, and the water outlet protruding pillar extends into the groove in which the first water outlet channel is located; and The water retaining channels comprise a second water inlet channel and a second water outlet channel, the water retaining member water inlets-outlets comprise a first water inlet that communicates with the second water inlet channel and a first water outlet that communicates with the second water outlet channel, the first water inlet is disposed in a top end of the water inlet protruding pillar, and the first water outlet is disposed in a top end of the water outlet protruding pillar.

Preferably, the water retaining member docking ports comprise a second water inlet that communicates with the second water inlet channel and a second water outlet that communicates with the second water outlet channel; the water dividing channels comprise a third water inlet channel and a third water outlet channel; and the water retaining member docking ports comprise a third water inlet that communicates with the third water inlet channel and a third water outlet that communicates with the third water outlet channel; and The water dividing member and the water retaining member control docking and undocking between the third water inlet and the second water inlet and between the third water outlet and the second water outlet through relative rotation, so that the third water inlet channel and the second water inlet channel are connected or disconnected, as well as the third water outlet channel and the second water outlet channel are connected or disconnected.

Preferably, the filter channels comprise a fourth water inlet channel and a fourth water outlet channel; the fourth water inlet channel is formed between the inner side wall of the housing and the outer side wall of the filter medium; a central pipe is disposed inside the filter core penetrating from one end to the other end of the filter medium, and the central pipe is the fourth water outlet channel; and overflow holes are disposed in a wall of the central pipe.

Preferably, the water dividing member water inlets-outlets comprise a fourth water inlet that connects the fourth water inlet channel and the third water inlet channel and a fourth water outlet that connects the fourth water outlet channel and the third water outlet channel; the fourth water inlet is disposed in a side wall of the connecting rod; a fixing shaft inserted into the central pipe is disposed on an end of the water dividing member away from the water retaining member; and the fourth water outlet is disposed in an end of the fixing shaft away from the water dividing member.

Preferably, the base channels further comprise a first discharging channel; the protruding pillars further comprise a discharging protruding pillar; the discharging protruding pillar extends into the groove in which the first discharging channel is located; the water retaining channels further comprise a second discharging channel; the water retaining member water inlets-outlets further comprises a first discharging outlet that communicates with the second discharging channel, and the first discharging outlet is disposed in a top end of the discharging protruding pillar;

The water retaining member docking ports further comprise a second discharging outlet that communicates with the second discharging channel; the water dividing channels further comprise a third discharging channel; the water dividing member docking ports further comprise a third discharging outlet that communicates with the third discharging channel; the third discharging outlet and the second discharging outlet are controlled through relative rotation between the water dividing member and the water retaining member to be docked or undocked, so that the third discharging channel and the second discharging channel are connected or disconnected; and The filter channels further comprise a fourth discharging channel, and the filter medium itself is the fourth discharging channel; the water dividing member water inlets-outlets further comprise a fourth discharging outlet that connects the fourth discharging channel and the third discharging channel, and the fourth discharging outlet is disposed in an end of the fixing shaft connected to the water dividing member.

Preferably, locking protrusions are disposed on an edge of the water dividing member, position-limiting slots corresponding to the locking protrusions are disposed in an inner side wall of the housing, and the locking protrusions and the position-limiting slots constitute a fixing position-limiting structure.

Preferably, there are at least two locking protrusions, and the at least two locking protrusions are evenly distributed along the circumferential direction of the water dividing member; and the position-limiting slots have the same quantity as the locking protrusions and correspond to the locking protrusions one to one.

Preferably, at least two of the locking protrusions have different sizes.

Preferably, a second opening that communicates with the filter cavity is disposed in a second end of the housing, and the second opening is covered with an end cap.

A further objective of the present invention is to provide a water purifier comprising the above filter cartridge device.

The embodiment of the present invention has the following beneficial effects:

The filter cartridge device provided by the present invention can control water supply or water cut-off by disposing the water stopping assembly, thereby preventing residual water in the filter cavity from flowing out during detachment of the filter cartridge device. In addition, the water stopping assembly control water supply or water cut-off on its side, which simplifies the assembly structure, ensures smooth relative rotation of the water dividing member and the water retaining member while ensuring sealing performance, and reduces slowness during rotation, thereby rendering users with good hand handle.

The present invention further provides a water purifier. The water purifier uses the foregoing filter cartridge device, and therefore has advantages such as no water leakage, no water channeling, and easy replacement of the filter cartridge.

Figure 1:
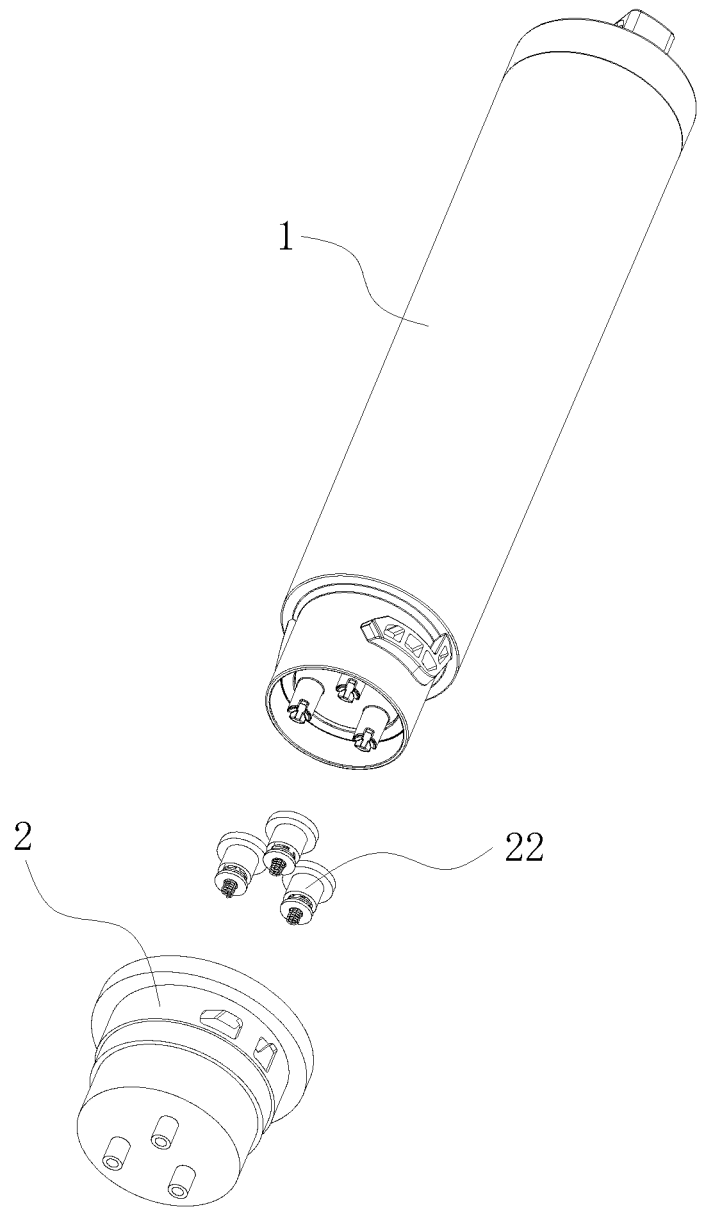
FIG. 1 is a schematic diagram of a filter cartridge body and a base which are separated according to an embodiment of the present invention.

REFERENCE NUMERALS 1. filter cartridge body, 11. housing, 111. filter cavity, 112. first opening, 113. second opening, 114. partition, 115. installation position, 116. second protruding block, 12. filter medium, 121. central pipe, 1211. overflow hole, 13. water stopping assembly, 131. water dividing member, 1311. rotating shaft, 1312. connecting rod, 1313. notch, 1314. fixing shaft, 1315. water dividing member process port, 1316. water dividing member water blocking cover, 1317. sealing member clamping slot, 132. water retaining member, 1321. shaft hole, 1322. water retaining member process port, 1323. water retaining member blocking cover, 133. sealing member, 1331. first rib, 1332. second rib, 1333. sealed cell, 14a. fourth water inlet channel, 14b. fourth water outlet channel, 14c. fourth discharging channel, 15a. third water inlet channel, 15b. third water outlet channel, 15c. third discharging channel, 151. third water inlet, 152. third water outlet, 153. third discharging outlet, 154. fourth water inlet, 155. fourth water outlet, 156. fourth discharging outlet, 16a. second water inlet channel, 16b. second water outlet channel, 16c. second discharging channel, 161. second water inlet, 162. second water outlet, 163. second discharging outlet, 164. water inlet protruding pillar, 165. water outlet protruding pillar, 166. discharging protruding pillar, 167. first water inlet, 168. first water outlet, 169. first discharging outlet, 171. first protruding block, 172. first sliding slot, 181. locking protrusion, 182. position-limiting slot, 19. end cap, 2. base, 20a. first water inlet channel, 20b. first water outlet channel, 20c. first discharging channel, 21. cavity, 22. automatic water locking assembly, 221. spring, 222. water sealing plug, 2221. position-limiting skirt, 223. water sealing sleeve, 23. groove, 231. first-step slot, 232. second-step slot, 24. second sliding slot, and 241. sliding port.

DETAILED DESCRIPTION

The technical solutions in the embodiments of the present invention hereafter will be clearly and completely described with reference to accompanying drawings in the embodiments of the present invention. Apparently, the described embodiments are merely a part rather than all of the embodiments of the present invention. All other embodiments obtained by a person of ordinary skill in the art based on the embodiments of the present invention without creative efforts shall fall within the protection scope of the present invention.

Figure 2:
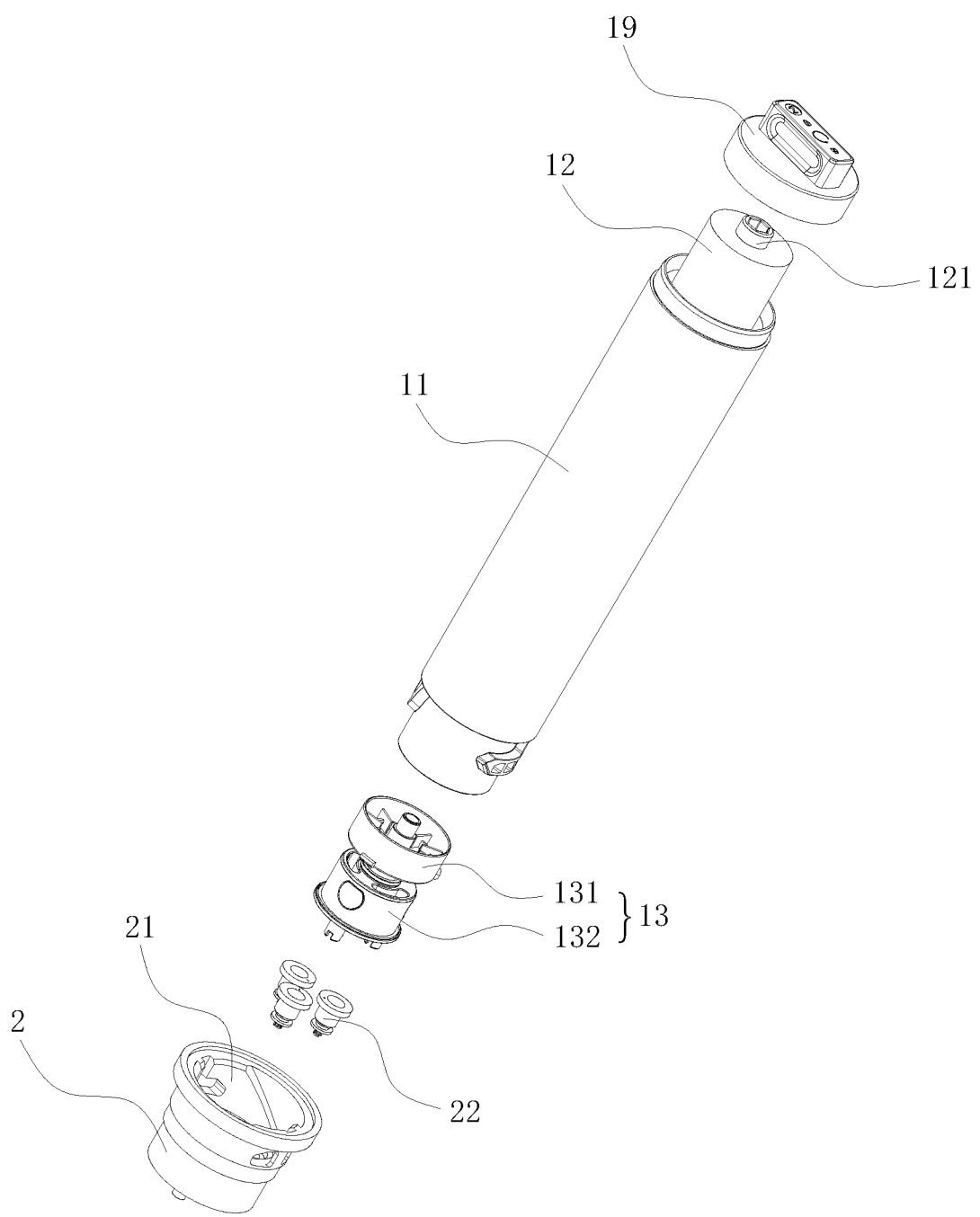
FIG. 2 is an explosive diagram of a filter cartridge device according to an embodiment of the present invention.

As shown in FIG. 1 and FIG. 2, an embodiment of the present invention provides a filter cartridge device, which mainly includes a filter cartridge body 1 and a base 2. The base 2 is provided with a cavity 21, and a first end of the filter cartridge body 1 is screwed into the cavity 21; body channels are disposed in the filter cartridge body 1, and base channels corresponding to the body channels are disposed in the base 2. In addition, automatic water locking assemblies 22 are disposed between the body channels and the base channels. Opening and closing of the automatic water locking assemblies 22 are controlled through relative rotation between the filter cartridge body 1 and the base 2, so as to connect and disconnect the body channel and the base channel.

Figure 3:
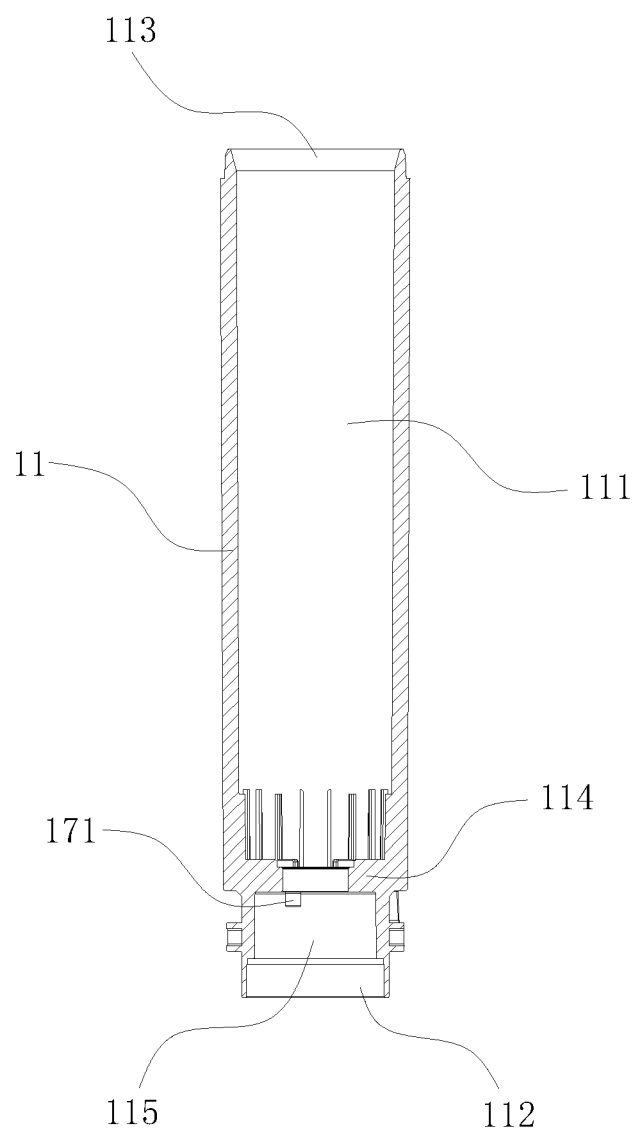
FIG. 3 is a schematic sectional view of a housing according to an embodiment of the present invention.
Figure 4:
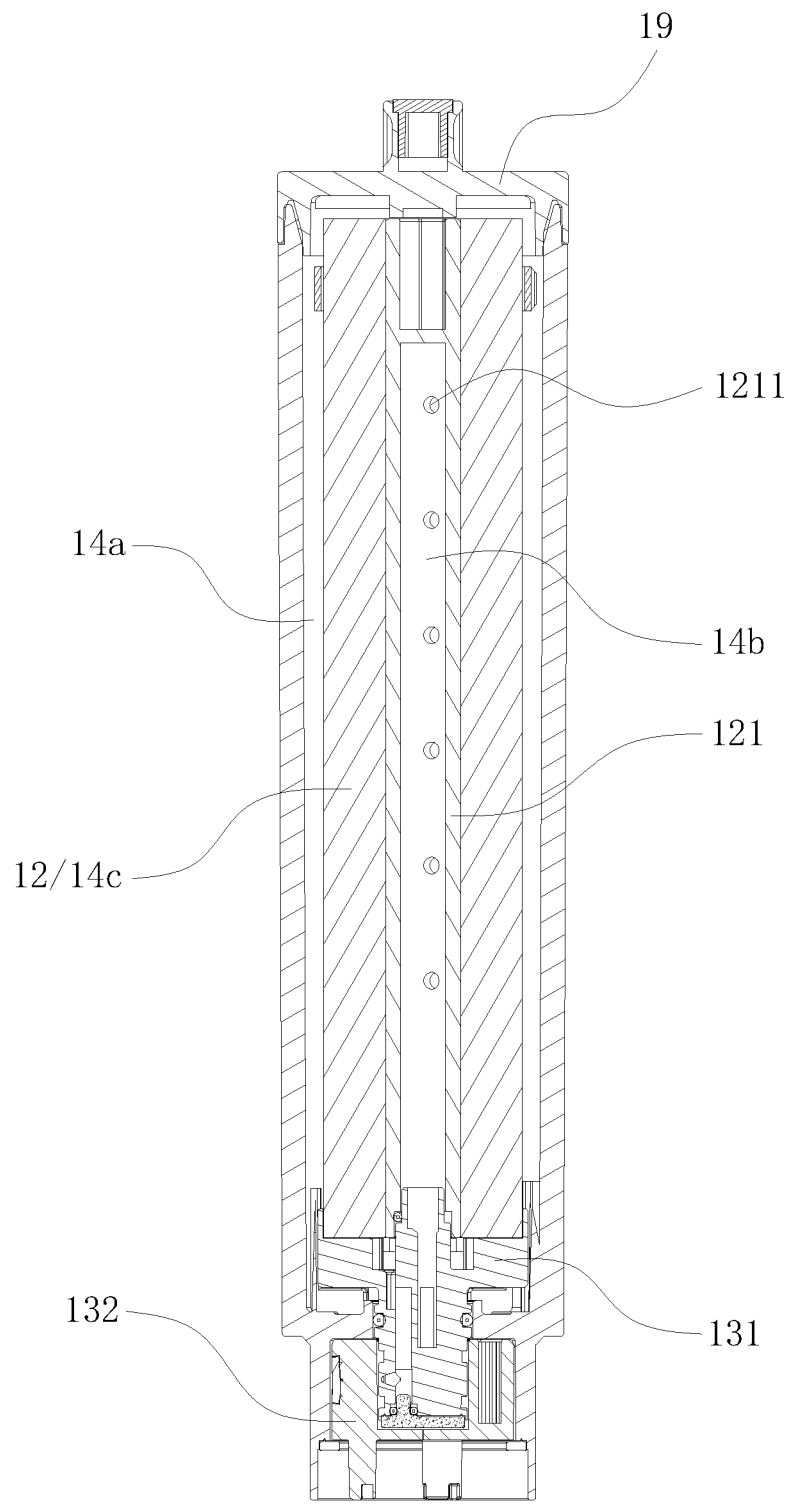
FIG. 4 is a schematic sectional view of a filter cartridge body according to an embodiment of the present invention.

Further, as shown in FIGS. 2 to 4, the filter cartridge body 1 includes a housing 11, a filter medium 12, and an end cap 19. The housing 11 is a hollow cylinder, and inside the housing 11 is a filter cavity 111 penetrating from one end to the other end of the housing 11. Two ends of the housing 11 are respectively provided with a first opening 112 and a second opening 113 that communicate with the filter cavity 111. The end cap 19 covers the second opening 113. The filter medium 12 is a cylinder in a similar shape as the housing 11. A central pipe 121 penetrating from one end to the other end of the filter medium 12 is disposed inside the filter medium 12, and overflow holes 1211 are disposed in a wall of the central pipe 121. The filter medium 12 is disposed in the filter cavity 111, and filter channels are formed in the filter cavity 111. Specifically, the filter channels include a fourth water inlet channel 14a, a fourth water outlet channel 14b, and a fourth discharging channel 14c. The fourth water inlet channel 14a is formed between an inner side wall of the housing 11 and an outer side wall of the filter medium 12, the central pipe 121 is the fourth water outlet channel 14b, and the filter medium 12 itself is the fourth discharging channel 14c.

Further, as shown in FIGS. 2 to 5, the filter cartridge body 1 further includes a water stopping assembly 13 that includes a water dividing member 131 and a water retaining member 132 that can rotate relative to each other. A partition 114 is disposed close to the first opening 112 at the inner side wall of the housing 11. The partition 114 and the inner side wall of the housing 11 form an installation position 115. The first opening 112 is the installation port of the installation position 115. The water retaining member 132 is installed in the installation position 115 and can rotate relative to the housing 11. When a first end of the housing 11 is screwed into the cavity 21 of the base 2, the base 2 limits rotation of the water retaining member 132. The water dividing member 131 is disposed in the filter cavity 111 on a side of the partition 114 away from the water retaining member 132. The water dividing member 131 can rotate together with the housing 11. The filter medium 12 is connected to an end of the water dividing member 131 away from the water retaining member 132.

Figure 5:
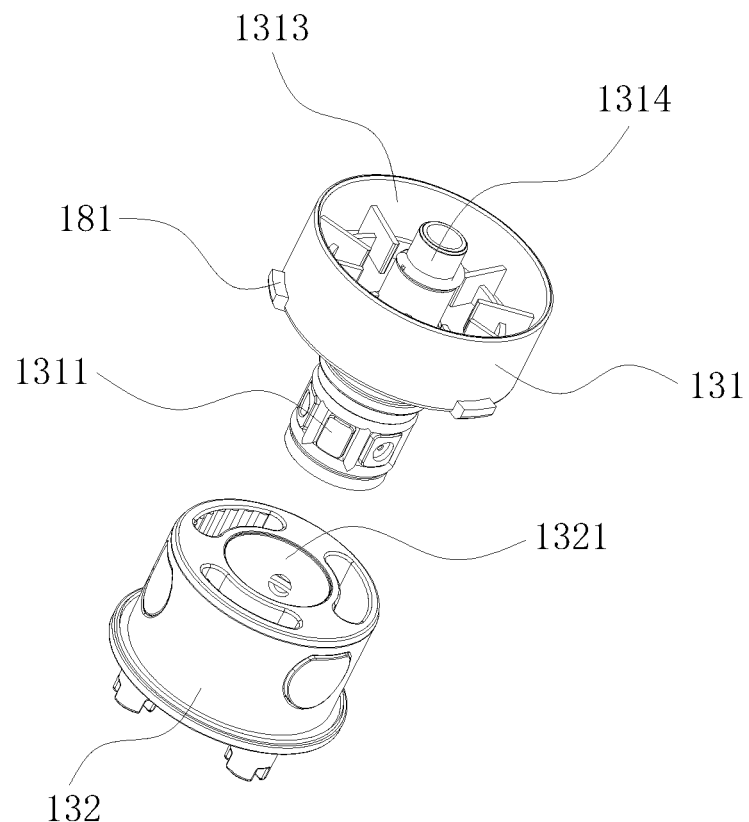
FIG. 5 is a schematic diagram of a separated water stopping assembly according to an embodiment of the present invention.

Further, as shown in FIGS. 3 to 5, the water dividing member 131 is connected to the water retaining member 132 through a rotating shaft structure which includes a rotating shaft 1311 and a shaft hole 1321. The rotating shaft 1311 is connected to one end of the water dividing member 131 through a connecting rod 1312. The shaft hole 1321 is disposed on one end of the water retaining member 132. A through hole is provided at the center of the partition 114. The rotating shaft 1311 is inserted into the shaft hole 1321 through the through hole to achieve rotational connection between the water retaining member 132 and the water dividing member 131. Certainly, the rotating shaft 1311 of the water dividing member 131 and the shaft hole 1321 of the water retaining member 132 can be exchanged in positions, that is, the shaft hole 1321 can be disposed on one end of the water dividing member 131, and the rotating shaft 1311 can be disposed on one end of the water retaining member 132. The technical effects are the same after position exchange.

Figure 6:
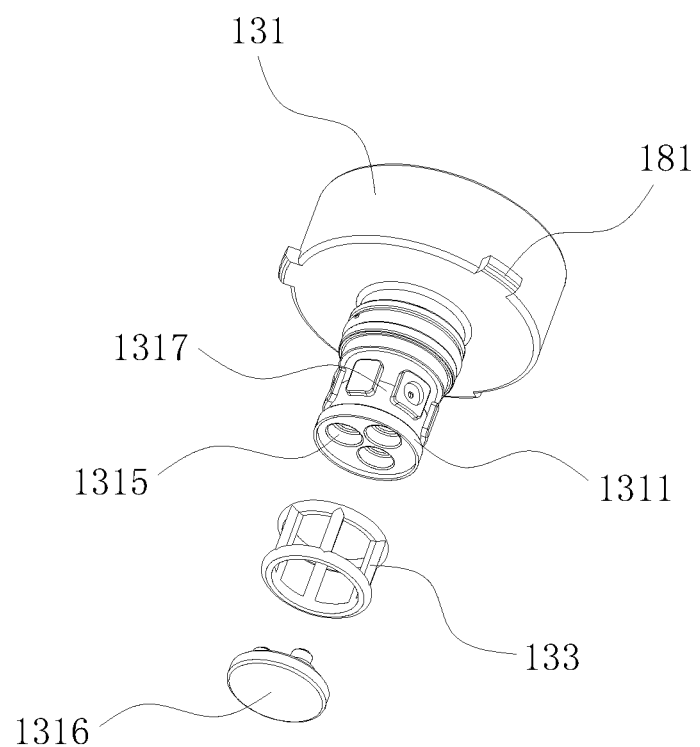
FIG. 6 is a schematic structural diagram of a water dividing member according to an embodiment of the present invention.
Figure 7:
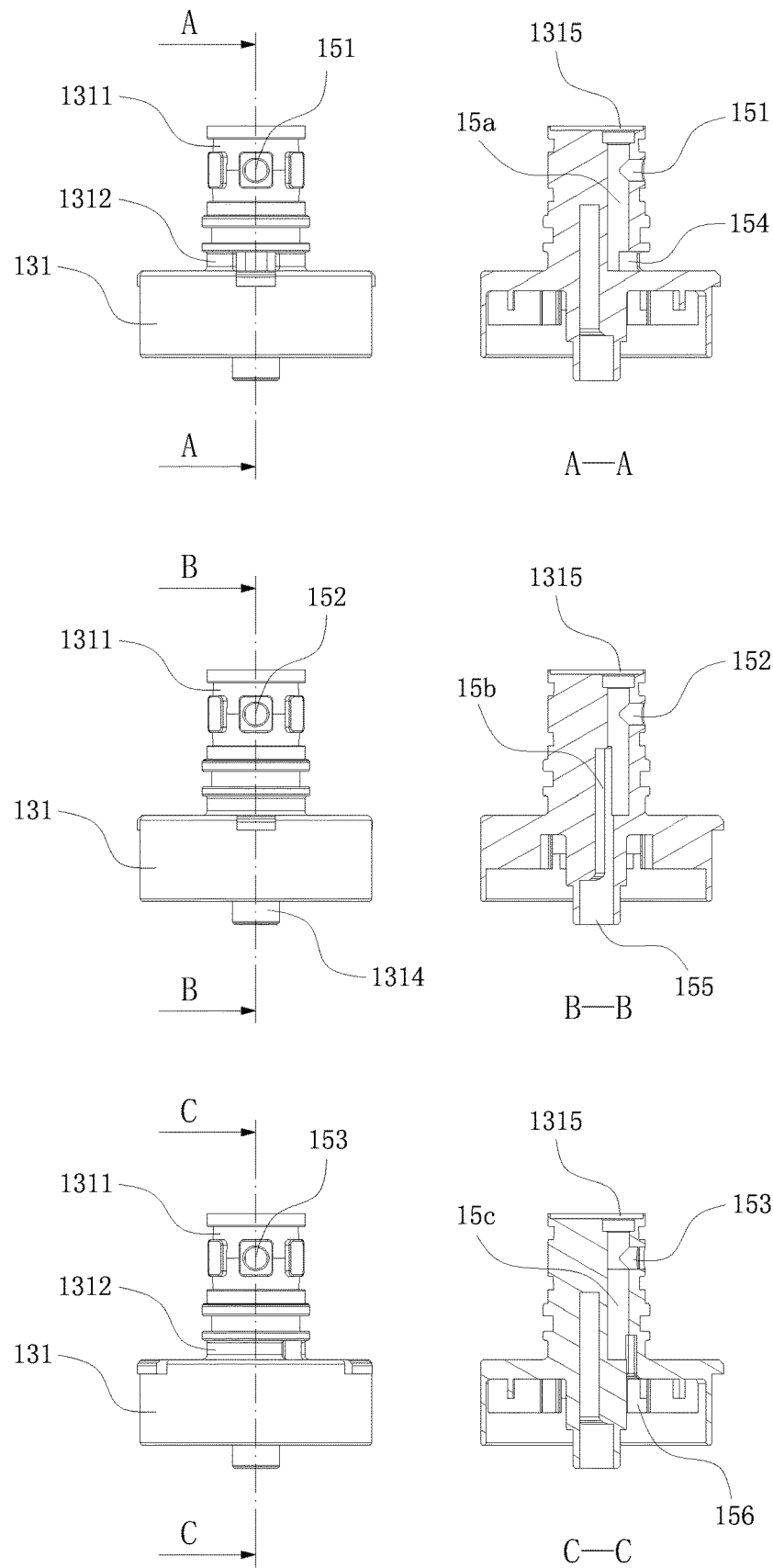
FIG. 7 is a schematic sectional view of water dividing channels according to an embodiment of the present invention.

Further, as shown in FIGS. 6 and 7, the water dividing member 131 are provided with water dividing channels, and a side wall of the rotating shaft 1311 is provided with water dividing member docking ports that communicate with the water dividing channels. Specifically, the water dividing channels include a third water inlet channel 15a, a third water outlet channel 15b, and a third discharging channel 15c; the water dividing member docking ports include a third water inlet 151 that communicates with the third water inlet channel 15a, a third water outlet 152 that communicates with the third water outlet channel 15b, and a third discharging outlet 153 that communicates with the third discharging channel 15c; and the three water dividing member docking ports are evenly distributed on a side wall of the rotating shaft 1311 along the circumferential direction of the rotating shaft 1311. Correspondingly, the water retaining member 132 is provided with water retaining channels, and a side wall of the shaft hole 1321 is provided with water retaining member docking ports that communicate with the water retaining channels. Specifically, the water retaining channels include a second water inlet channel 16a, a second water outlet channel 16b, and a second discharging channel 16c; the water retaining member docking ports include a second water inlet 161 that communicates with the second water inlet channel 16a, a second water outlet 162 that communicates with the second water outlet channel 16b, and a second discharging outlet 163 that communicates with the second discharging channel 16c; and the three water retaining member docking ports are evenly distributed on the side wall of the shaft hole 1321 along the circumferential direction of the shaft hole 1321. On this basis, the relative rotating side surfaces between the rotating shaft 1311 and the shaft hole 1321 are docking surfaces of the water dividing member docking ports and the water retaining member docking ports. Docking and undocking between the third water inlet 151 and the second water inlet 161, between the third water outlet 152 and the second water outlet 162, and between the third discharging outlet 153 and the second discharging outlet 163 can be controlled through relative rotation between the water dividing member 131 and the water retaining member 132, to realize connection and disconnection between the third water inlet channel 15a and the second water inlet channel 16a, between the third water outlet channel 15b and the second water outlet channel 16b, and between the third discharging channel 15c and the second discharging channel 16c. Obviously, the filter channels, the water dividing channels, and the water retaining channels form the body channels of the filter cartridge body.

Based on the foregoing structure, on the one hand, through the relative rotation between the water dividing member 131 and the water retaining member 132, the water stopping assembly 13 can achieve water supply and water cut-off, preventing residual water within the filter cavity 111 from flowing out during detachment of the filter cartridge device. On the other hand, through the relative rotation between the housing 11 and the base 2, water supply and water cut-off between the filter cartridge device and an external pipe can be controlled by the automatic water locking assemblies 22, preventing water within the external pipe from flowing out during detachment of the filter cartridge device. Therefore, a two-way sealing structure composed of the water stopping assembly 13 and the automatic water locking assemblies 22 completely eliminates the hidden trouble of water leakage, and ensures that the filter cartridge device is kept dry and tidy when it is detached. In addition, the docking surfaces between the water dividing member docking ports and the water retaining member docking ports are the relative rotating side surfaces of the rotating shaft 1311 and the shaft hole 1321, which simplifies the assembly structure, improves the production efficiency, and reduces the defect rate of the finished product. This also improve smoothness of the relative rotation between the water dividing member 131 and the water retaining member 132 while ensuring the sealing performance, and reduces slowness during rotation, thereby rendering users with better hand handle.

Figure 12:
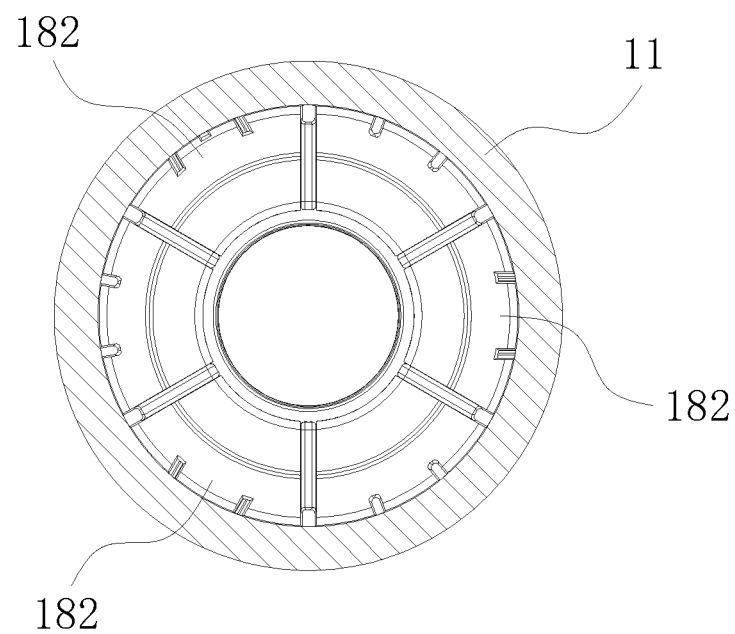
FIG. 12 is a schematic structural diagram of position-limiting slots according to an embodiment of the present invention.

Further, refer to FIGS. 6 and 12 on the basis of FIG. 4. In order to enable the water dividing member 131 to rotate together with the housing 11, an edge of the water dividing member 131 is provided with locking protrusions 181, and the inner side wall of the housing 11 is provided with position-limiting slots 182 corresponding to the locking protrusions 181. The locking protrusions 181 and the position-limiting slots 182 form a fixing position-limiting structure, which can prevent the water dividing member 131 from rotating relative to the housing 11. Preferably, there are two or more locking protrusions 181, and the two or more locking protrusions 181 are evenly distributed along the circumferential direction of the water dividing member 131. The position-limiting slots 182 have the same quantity as the locking protrusions 181 and correspond to the locking protrusions 181 one to one, that is, two or more position-limiting slots 182 are evenly distributed along the circumferential direction of the housing 11. On this basis, in order to ensure that the water dividing member 131 is properly installed and that each water dividing member docking port is correctly docked with each water retaining member docking port, at least two of the locking protrusions 181 have different sizes, and the position-limiting slots 182 correspond to the locking protrusions 181 one to one. Therefore, the fixing position-limiting structure has a fool-proof function. The locking protrusions 181 and the position-limiting slots 182 with corresponding sizes determine the only installation position of the water dividing member 131 in the filter cavity 111, and ensure that the water dividing member docking ports correctly correspond to the water retaining member docking ports. Certainly, the locking protrusions 181 and the position-limiting slots 182 can be exchanged in positions, that is, the locking protrusions 181 can be disposed on the inner side wall of the housing 11, and the position-limiting slots 182 can disposed on the outer side wall of the water dividing member 131. The technical effects are the same after position exchange.

Figure 8:
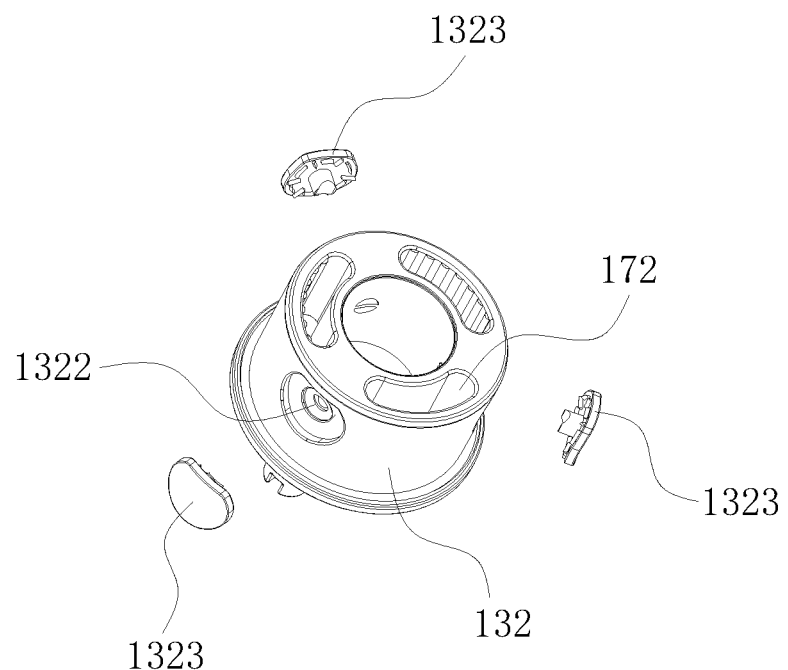
FIG. 8 is a schematic structural diagram 1 of a water retaining member according to an embodiment of the present invention.

Further, as shown in FIGS. 3, 4, and 8, in order to limit the relative rotation angle between the water retaining member and the water dividing member and prevent water channeling, first protruding blocks 171 are disposed on a side of the partition 114 facing the water retaining member 132, first sliding slots 172 corresponding to the first protruding blocks 171 are disposed on an end of the water retaining member 132 facing the partition 114, and the first protruding blocks 171 and the first sliding slots 172 constitute a sliding position-limiting structure. In addition, the sliding position-limiting structure and the water stopping assembly 13 have the following relationships: when the first protruding blocks 171 slide to first ends of the first sliding slots 172 with rotation of the housing 11, the water dividing member docking ports and the water retaining member docking ports are fully docked; and when the first protruding blocks 171 slide to second ends of the first sliding slots 172 with the rotation of the housing 11, the water dividing member docking ports and the water retaining member docking ports are fully undocked. On this basis, a user can quickly and accurately dock or undock the water dividing member docking ports and the water retaining member docking ports, without deliberately controlling the relative rotation angle between the water dividing member 131 and the water retaining member 132. Certainly, the first protruding blocks 171 and the first sliding slots 172 can be exchanged in positions, that is, the first protruding blocks 171 can be disposed on the water retaining member 132, and the first sliding slots 172 can be disposed on the partition 114 of the housing. The technical effects are the same after position exchange.

Further, as shown in FIGS. 4 to 7, a notch 1313 is provided on an end of the water dividing member 131 away from the water retaining member 132, and an end of the filter medium 12 is inserted into the notch 1313 of the water dividing member 131. In addition, a fixing shaft 1314 is disposed in the notch 1313, and the center lines of the rotating shaft 1311, the connecting rod 1312, and the fixing shaft 1314 coincide. The fixing shaft 1314 is inserted into the central pipe 121, enhancing fixed connection between the water dividing member 131 and the filter medium 12. On this basis, water dividing member water inlets-outlets that connect the water dividing channels and the filter channels are disposed in the water dividing member 131. Specifically, the water dividing member water inlets-outlets include a fourth water inlet 154 that connects the fourth water inlet channel 14a and the third water inlet channel 15a, a fourth water outlet 155 that connects the fourth water outlet channel 14b and the third water outlet channel 15b, and a fourth discharging outlet 156 that connects the fourth discharging channel 14c and the third discharging channel 15c. The fourth water inlet 154 is disposed on a side wall of the connecting rod 1312, the fourth water outlet 155 is disposed on an end of the fixing shaft 1314 away from the water dividing member 131, and the fourth discharging outlet 156 is disposed on an end of the fixing shaft 1314 connecting to the water dividing member 131. On this basis, the fourth water inlet channel 14a, the fourth water outlet channel 14b, and the fourth discharging channel 14c are completely separated by the filter medium 12, ensuring complete and effective filtration, avoiding that tap water is discharged without being filtered, and improving the filtration quantity. In addition, in order to facilitate production and formation of the water dividing channels, a top end of the rotating shaft 1311 is provided with three water dividing member process ports 1315 that respectively communicate with the third water inlet channel 15a, the third water outlet channel 15b, and the third discharging channel 15c. In addition, the three water dividing member process ports 1315 are covered by a same water dividing member water blocking cover 1316 to prevent water leakage.

Figure 9:
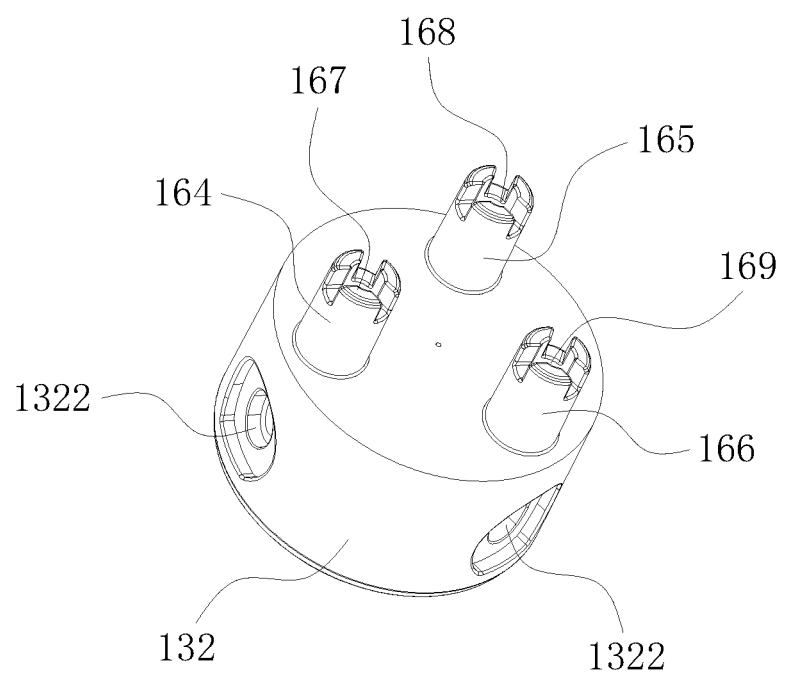
FIG. 9 is a schematic structural diagram 2 of a water retaining member according to an embodiment of the present invention.
Figure 10:
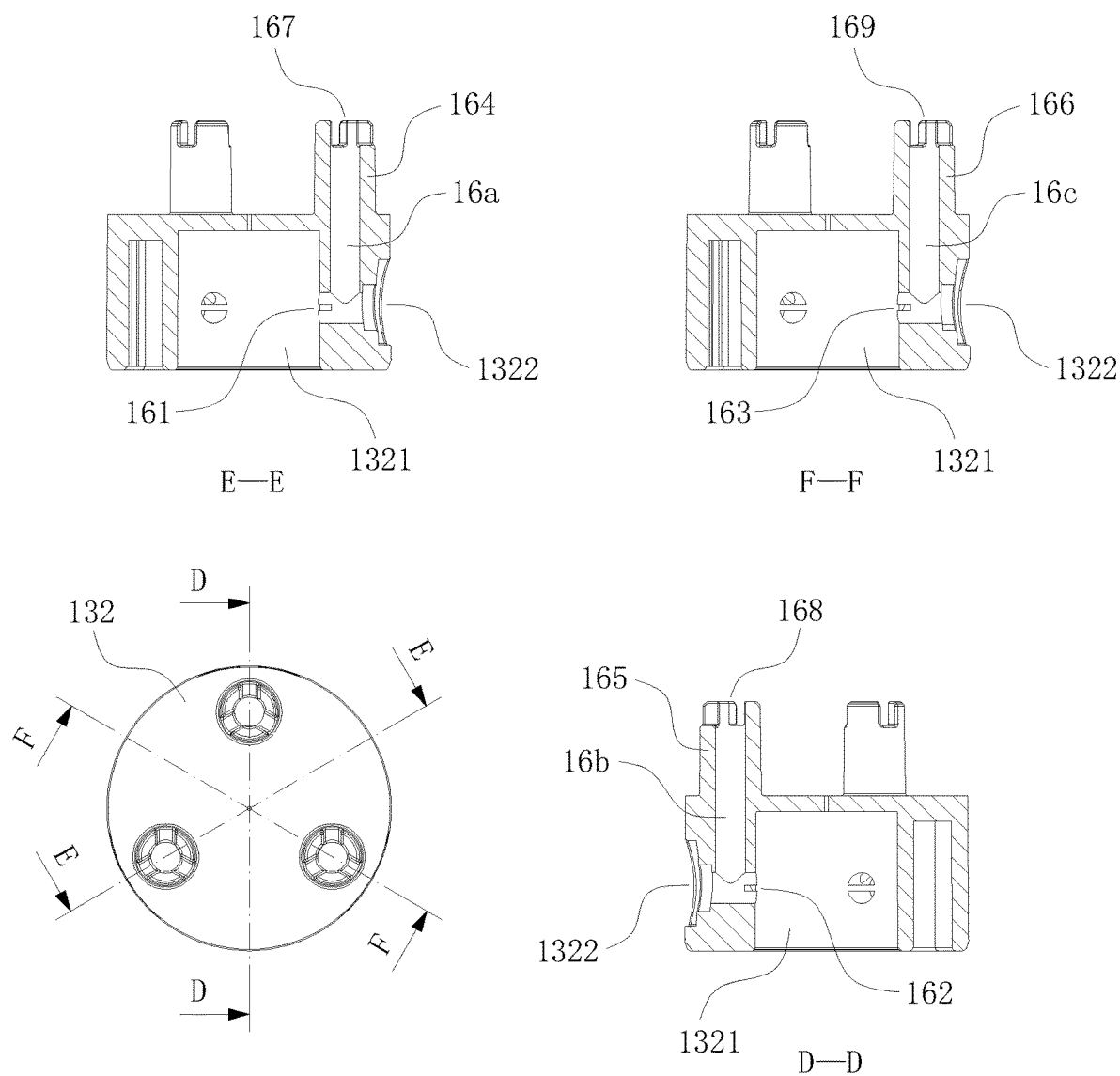
FIG. 10 is a schematic sectional view of water retaining channels according to an embodiment of the present invention.

Further, as shown in FIGS. 8 to 10, an end of the water retaining member 132 away from the water dividing member 131 is provided with protruding pillars that correspond to the water retaining channels one to one. The protruding pillars include a water inlet protruding pillar 164 corresponding to the second water inlet channel 16a, a water outlet protruding pillar 165 corresponding to the second water outlet channel 16b, and a discharging protruding pillar 166 corresponding to the second discharging channel 16c. On this basis, are disposed on the water retaining member 132 is provided with water retaining member water inlets-outlets that communicate with the water retaining channels. Specifically, the water retaining member water inlets-outlets include a first water inlet 167 that communicates with the second water inlet channel 16a, a first water outlet 168 that communicates with the second water outlet channel 16b, and a first discharging outlet 169 that communicates with the second discharging channel 16c. The first water inlet 167 is disposed on a top end of the water inlet protruding pillar 164, the first water outlet 168 is disposed on a top end of the water outlet protruding pillar 165, and the first discharging outlet 169 is disposed on a top end of the discharging protruding pillar 166. In addition, in order to facilitate production and formation of the water retaining channels, the outer side wall of the water retaining member 132 is provided with three water retaining member process ports 1322 that respectively communicate with the second water inlet channel 16a, the second water outlet channel 16b, and the second discharging channel 16c. In addition, each water retaining member process port 1322 is covered by a water retaining member water blocking cover 1323 to prevent water leakage.

Figure 11:
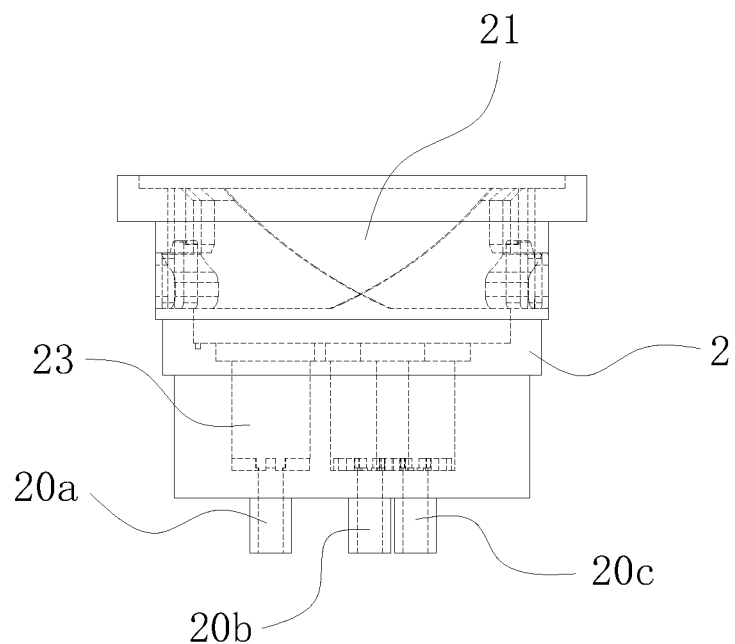
FIG. 11 is a schematic structural diagram of base channels according to an embodiment of the present invention.

Further, refer to FIG. 11 on the basis of FIG. 2, the base channels include a first water inlet channel 20a, a first water outlet channel 20b, and a first discharging channel 20c. When the first end of the housing 11 is screwed into the base 2, the second water inlet channel 16a is aligned with the first water inlet channel 20a, the second water outlet channel 16b is aligned with the first water outlet channel 20b, and the second discharging channel 16c is aligned with the first discharging channel 20c. Automatic water locking assemblies 22 are disposed between the second water inlet channel 16a and the first water inlet channel 20a, between the second water outlet channel 16b and the first water outlet channel 20b, and between the second discharging channel 16c and the first discharging channel 20c.

Figure 13:
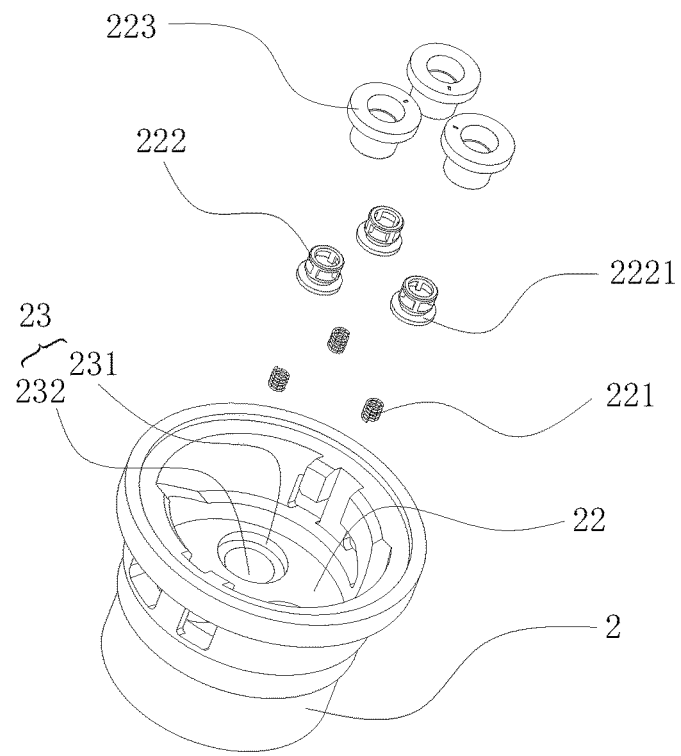
FIG. 13 is a schematic structural diagram of automatic water retaining assemblies according to an embodiment of the present invention.

Further, as shown in FIG. 11 and FIG. 13, grooves 23 that correspond to the base channels one to one are disposed in the cavity 21 of the base 2, and an automatic water locking assembly 22 is disposed in each groove 23. The grooves 23 are stepped grooves, each of which includes a first-step slot 231 and a second-step slot 232. The base channels are disposed at the bottom of the second-step slots 232. That is, there are three grooves 23, and the first water inlet channel 20a, the first water outlet channel 20b, and the first discharging channel 20c are respectively disposed at the bottom of the second-step slots 232 of the three grooves 23. The automatic water locking assembly 22 includes a spring 221, a water sealing plug 222, and a water sealing plug 213. The water sealing sleeves 223 are installed in the first-step slots 231 through assembly processes such as ultrasonic welding or glue bonding. The water sealing plugs 222 are disposed in the water sealing sleeves 223, and are provided with position-limiting skirts 2221 to prevent the water sealing plugs 222 from ejecting from the water sealing sleeves 223. The springs 221 are disposed in the second-step slots 232 and press against the water sealing plugs 222. The water inlet protruding pillar 164, the water outlet protruding pillar 165, and the discharging protruding pillar 166 of the water retaining member 132 extend into their respective water sealing sleeves 223. On this basis, when the first end of the housing 11 is being screwed into the cavity 21 of the base 2, the protruding pillars extend into the water sealing sleeves 223 to limit the rotation of the water retaining member 132, and at the same time, the water inlet protruding pillar 164, the water outlet protruding pillar 165, and the discharging protruding pillar 166 push out the respective water sealing plugs 222 of the automatic water locking assemblies 22, so that the second water inlet channel 16a communicates with the first water inlet channel 20a, the second water outlet channel 16b communicates with the first water outlet channel 20b, and the second discharging channel 16c communicates with the first discharging channel 20c.

Figure 14:
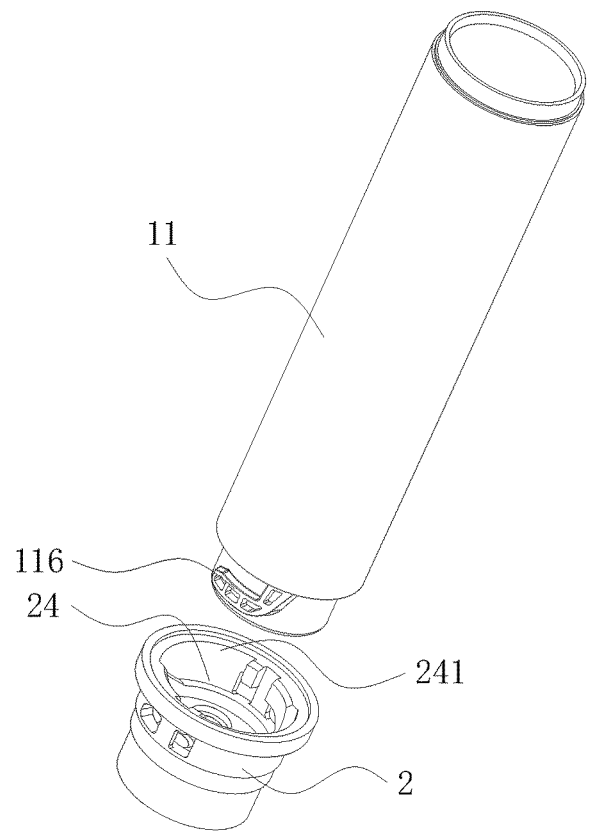
FIG. 14 is a schematic structural diagram of a rotary connection structure according to an embodiment of the present invention.

Further, as shown in FIGS. 13 and 14, the inner side wall of the base 2 is provided with second sliding slots 24 which extend to the opening edge of the cavity 21, and the opening edge of the cavity 21 is provided with sliding ports 241 for the second sliding slots 24. The outer side wall of the housing 11 is provided with second protruding blocks 116 corresponding to the second sliding slots 24. The second protruding blocks 116 and the second sliding slots 24 constitute a rotary connection structure. In addition, the rotary connection structure and the water stopping assembly 13 have the following relationships: when the second protruding blocks 116 slide to the innermost of the second sliding slots 24 with the rotation of the housing 11, the first end of the housing 11 is completely screwed into the cavity 21 of the base 2, and the protruding pillars of the water retaining member 132 overcome the elastic force of the springs 221 and completely push out the water sealing plugs 222, so that the water retaining channels communicate with the base channels; and when the second protruding blocks 116 slide out of the second sliding slots 24 from the sliding ports 241 with the rotation of the housing 11, the first end of the housing 11 is completely screwed out of the cavity 21 of the base 2, and the protruding pillars of the water retaining member 132 do not press against the water sealing plugs 222, and the springs 221 push the water sealing plugs 222 into the water sealing sleeves 223 by using their restoring force, so that the water retaining channels are disconnected from the base channels.

Based on the forgoing fixing position-limiting structure, sliding position-limiting structure, and rotary connection structure, a user can simultaneously control the water stopping assembly 13 and the automatic water locking assemblies 22 to realize synchronous connection or disconnection between the water stopping assembly 13 and the automatic water locking assemblies 22. Specifically, in order to detach the filter cartridge device, the user rotates the housing 11, so as to drive the water dividing member 131 and the water retaining member 132 to rotate relative to each other, then the first protruding blocks 171 slide to the second ends of the first sliding slots 172, the water dividing member docking ports and the water retaining member docking ports are undocked, so that the water stopping assembly 13 cuts off water flow. At the same time, the second protruding blocks 116 slide out of the second sliding slots 24 from the sliding ports 241, the housing 11 is completely screwed out of the cavity 21 of the base 2, the water sealing plugs 222 are pushed into the water sealing sleeves 223 by the springs 221, and the automatic water locking assemblies 22 cut off water flow. In this way, the two-way sealing structure realizes synchronous water cut-off. On the contrary, in order to install the filter cartridge device, the user rotates the housing 11 to drive the water dividing member 131 and the water retaining member 132 to rotate relative to each other, the first protruding blocks 171 slide to the first ends of the first sliding slots 172, the water dividing member docking ports and the water retaining member docking ports are fully docked, so that the water stopping assembly 13 supplies water. At the same time, the second protruding blocks 116 slide to the innermost of the second sliding slots 24, the housing 11 is completely screwed into the cavity 21 of the base 2, the water sealing plugs 222 are pushed out of the water sealing sleeves 223 by the protruding pillars of the water retaining member 132, and the automatic water locking assemblies 22 supply water. In this way, the two-way sealing structure realizes synchronous water supply.

Figure 15:
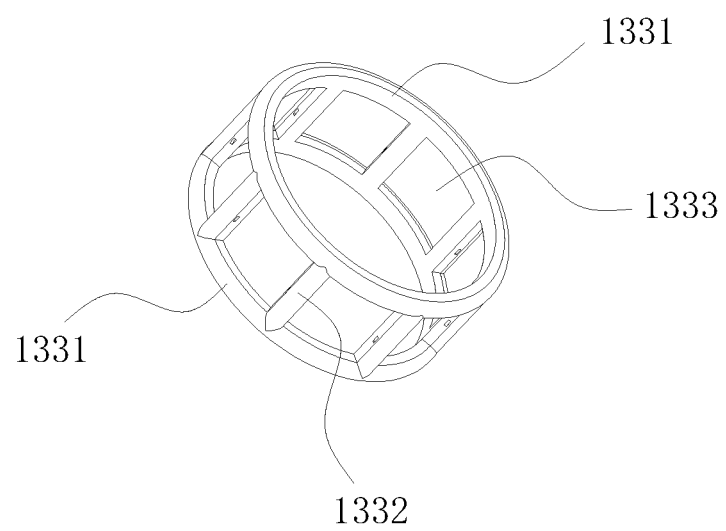
FIG. 15 is a schematic structural diagram of a sealing member according to an embodiment of the present invention.

Further, as shown in FIGS. 6 and 15, in order to improve the sealing performance of the water dividing member docking ports and the water retaining member docking ports to prevent water channeling and leakage between the adjacent water dividing member docking ports and between the adjacent water retaining member docking ports during relative rotation between the rotating shaft 1311 and the shaft hole 1321, a sealing member 133 sleeved outside the rotating shaft 1311 is disposed between the rotating shaft 1311 and the shaft hole 1321, and the outer side wall of the rotating shaft 1311 is provided with a sealing member clamping slot 1317 for the sealing member 133 to be clipped into. Specifically, the sealing member 133 includes two first ribs 1331 and a plurality of second ribs 1332 connected between the first ribs. The first rib 1331 preferably has a ring shape, or may be a long strip that can be formed into a ring. Two adjacent second ribs 1332 and the two first ribs 1331 form sealed cells 1333, and the water dividing member docking ports are located in the sealed cells 1333. Also, there is at least one sealed cell 1333 between any two adjacent water dividing member docking ports. On this basis, the first ribs 1331 can prevent water from overflowing from a gap between the rotating shaft 1311 and the shaft hole 1321, and the sealed cells 1333 formed by the second ribs 1332 separate the water dividing member docking ports from each other. In addition, with the relative rotation between the rotating shaft 1311 and the shaft hole 1321, the sealed cells 1333 rotate with the corresponding water dividing member docking ports. When the water dividing member docking ports and the water retaining member docking ports are undocked, the water overflowing from the water dividing member is always kept in the sealed cells 1333 corresponding to the dividing member docking ports, and the water overflowing from the water retaining member docking ports flows into the sealed cells 1333 corresponding to the water retaining member docking ports. When the water dividing member docking ports and the water retaining member docking ports are docked again, the water overflowing from the water retaining member docking ports is retained in the respective sealed cells 1333, without flowing and causing cross infection. Therefore, the sealing member 133 can well solve the problems of water channeling and water leakage between the adjacent water dividing member docking ports and between the adjacent water retaining member docking ports.

The water flow direction in the filter cartridge device provided by the present invention is as follows: the tap water enters the filter cavity 111 through the first water inlet channel 20a, the second water inlet channel 16a, the third water inlet channel 15a, and the fourth water inlet channel 14a in sequence, and is filtered by the filter medium 12; the pure water produced flows out through the fourth water outlet channel 14b, the third water outlet channel 15b, the second water outlet channel 16b, and the first water outlet channel 20b in sequence; and the generated waste water is discharged through the fourth discharging channel 14c, the third discharging channel 15c, the second discharging channel 16c, and the first discharging channel 20c in sequence.

It should be pointed out that the channels in the filter cartridge device provided by the present invention can be reduced in number as required, for example, only the water inlet channels and the water outlet channels are disposed without the discharging channels. In addition, the filter cartridge device provided by the present invention is mainly used in water purifiers, but it can also be applied to the field of other purification technologies. The filter medium 12 can be an RO filter medium (reverse osmosis filter medium), a PP filter medium, an activated carbon filter medium, an ultrafiltration filter medium, or the like.

Compared with the prior art, the filter cartridge device provided by the present invention has the following beneficial effects:

1. The water stopping assembly 13 can control water supply and water cut-off, preventing residual water in the filter cavity 111 from flowing out during detachment of the filter cartridge device;

2. The automatic water locking assemblies 22 can control connection and disconnection between the filter cartridge device and an external pipe, preventing the residual water in the external pipe from flowing out during the detachments of the filter cartridge device;

3. The water stopping assembly 13 controls water supply and water cut-off on its side surface, which simplifies the assembly structure, improves the production efficiency, and reduces the defect rate of the finished product. This also improves the relative rotation smoothness of the water dividing member 131 and the water retaining member 132 while ensuring the sealing performance, thereby rendering users with better hand handle;

4. Based on the fixing position-limiting structure, the sliding position-limiting structure, and the rotary connection structure, a user can simultaneously control the water stopping assembly 13 and the automatic water locking assemblies 22 by rotating the housing 11, so as to realize synchronous water supply or water cut-off between the water stopping assembly 13 and the automatic water locking assemblies 22, which renders operation simple and convenient;

5. The connection mode of the water dividing member 131 and the filter medium 12 is unique, and the water inlet channels, the water outlet channels, and the discharging channels are completely separated from each other by the filter medium 12, thereby ensuring complete and effective filtration, avoiding that the tap water is discharged without being filtered, and improving filtration quality;

6. Both the water dividing member 131 and the water retaining member 132 have process ports, which is convenient for the production and formation of channels; and 7. The components of the filter cartridge device are simple in structure, and can be easily produced and assembled with low costs.

The present invention further provides a water purifier. The water purifier uses the foregoing filter cartridge device, and therefore has advantages such as no water leakage, no water channeling, and easy replacement of a filter cartridge.

It should be understood that the terms such as "first", "second", and the like are used in the present invention to describe various information, but the information should not be limited to these terms, and these terms are only used to distinguish the same type of information from each other. For example, without departing from the scope of the present invention, "first" information may be referred to as "second" information, and similarly, "second" information may be referred to as "first" information.

The descriptions above are preferred embodiments of the present invention, and it should be noted that for a person of ordinary skill in the art, various improvements and modifications can be made without departing from the principles of the present invention. These improvements and modifications should also be regarded as falling in the protection scope of the present invention.

The invention claimed is:

1. A filter cartridge device, wherein the filter cartridge device comprises a housing, a filter medium, and a water stopping assembly,
the housing has a filter cavity, the filter medium is disposed in the filter cavity, and filter channels are formed in the filter cavity;
a first opening that communicates with the filter cavity is disposed on a first end of the housing, and the water stopping assembly comprises a water retaining member and a water dividing member that can rotate relative to each other, the water retaining member is disposed in the first opening and can rotate relative to the housing, the water dividing member is disposed in the filter cavity and is connected to the water retaining member through a rotating shaft structure, the water dividing member can rotate together with the housing, and the filter medium is connected to an end of the water dividing member away from the water retaining member;
the water dividing member has water dividing channels and water dividing member docking ports that communicate with the water dividing channels; the water retaining member has water retaining channels and water retaining member docking ports that communicate with the water retaining channels; and the water dividing member docking ports and the water retaining member docking ports are controlled to be docked or undocked through relative rotation of the water dividing member and the water retaining member, to connect or disconnect the water dividing channels and the water retaining channels; and
the water dividing member also has water dividing member water inlets-outlets, and the water dividing channels communicate with the filter channels through the water dividing member water inlets-outlets; and the water retaining member also has water retaining member water inlets-outlets that communicate with the water retaining channels.

2. The filter cartridge device according to claim 1, wherein the rotating shaft structure comprises a rotating shaft and a shaft hole, the rotating shaft is connected to one end of the water dividing member through a connecting rod, the water dividing member docking ports are disposed on a side wall of the rotating shaft, the shaft hole is disposed on one end of the water retaining member, the water retaining member docking ports are disposed on a side wall of the shaft hole, and the rotating shaft is inserted into the shaft hole so that the water dividing member is rotatably connected with the water retaining member.

3. The filter cartridge device according to claim 2, wherein a sealing member is disposed between the rotating shaft and the shaft hole, an outer side wall of the rotating shaft is provided with a clamping slot for the sealing member to be clipped into, and the sealing member forms sealed cells around the water dividing member docking ports.

4. The filter cartridge device according to claim 3, wherein the sealing member comprises two first ribs and a plurality of second ribs connected between the first ribs, and two adjacent second ribs and the two first ribs form the sealed cells.

5. The filter cartridge device according to claim 4, wherein the first rib has a ring shape or is a long strip that can be formed into a ring.

6. The filter cartridge device according to claim 3, wherein the water dividing member docking ports are located in the respective sealed cells.

7. The filter cartridge device according to claim 3, wherein at least one sealed cell is provided between any two adjacent water dividing member docking ports.

8. The filter cartridge device according to claim 2, wherein a partition is disposed close to the first opening at an inner side wall of the housing; the partition and the inner side wall of the housing form an installation position, and the first opening is an installation port for the installation position; the water retaining member is installed in the installation position; the water dividing member is disposed at a side of the partition away from the water retaining member; a through hole is disposed in a center of the partition, and the rotating shaft passes through the through hole and is rotatably connected to the shaft hole.

9. The filter cartridge device according to claim 8, wherein first protruding blocks are disposed on a side surface of the partition facing the water retaining member, first sliding slots corresponding to the first protruding blocks are disposed in an end of the water retaining member facing the partition, and the first protruding blocks and the first sliding slots constitute a sliding position-limiting structure.

10. The filter cartridge device according to claim 9, wherein relationships between the sliding position-limiting structure and the water stopping assembly are as follows:
when the first protruding blocks slide to first ends of the first sliding slots with rotation of the housing, the water dividing member docking ports and the water retaining member docking ports are fully docked; and
when the first protruding blocks slide to second ends of the first sliding slots with the rotation of the housing, the water dividing member docking ports and the water retaining member docking ports are fully undocked.

11. The filter cartridge device according to claim 2, wherein the filter cartridge device further comprises a base provided with a cavity, the first end of the housing is screwed into the cavity, grooves are provided in a bottom of the cavity, protruding pillars are disposed on an end of the water retaining member away from the water dividing member, and the protruding pillars are inserted into the grooves to limit rotation of the water retaining member; and
base channels are provided at the bottom of the grooves; water retaining member water inlets-outlets are arranged in top ends of the protruding pillars; automatic water locking assemblies are disposed in the grooves; and the protruding pillars are controlled through relative rotation of the housing and the base to open or close the automatic water locking assemblies, thereby connecting or disconnecting the water retaining channels and the base channels.

12. The filter cartridge device according to claim 11, wherein the grooves are stepped grooves, each of which comprises a first-step slot and a second-step slot; the base channels are disposed at bottoms of the second-step slots; the automatic water locking assembly comprises a spring, a water sealing plug, and a water sealing sleeve; the water sealing sleeves are disposed in the first-step slots, the water sealing plugs are disposed in the water sealing sleeves, the springs are disposed in the second-step slots and press against the water sealing plugs; and the protruding pillars are inserted into the water sealing sleeves and press off the water sealing plugs.

13. The filter cartridge device according to claim 11, wherein second sliding slots are disposed in an inner side wall of the base, the second sliding slots extend to an opening edge of the cavity, and the opening edge of the cavity is provided with sliding ports for the second sliding slots, the outer side wall of the housing is provided with second protruding blocks corresponding to the second sliding slots, and the second protruding blocks and the second sliding slots constitute a rotary connection structure.

14. The filter cartridge device according to claim 13, wherein relationships between the rotary connection structure and the water stopping assembly are as follows:
when the second protruding blocks slide to innermost ends of the second sliding slots with rotation of the housing, the water dividing member docking ports and the water retaining member docking ports are fully docked; and
when the second protruding blocks slide out of the second sliding slots through the sliding ports with the rotation of the housing, the water dividing member docking ports and the water retaining member docking ports are fully undocked.

15. The filter cartridge device according to claim 11, wherein the base channels comprise a first water inlet channel and a first water outlet channel, the grooves have the same quantity as the base channels and correspond to the base channels one to one; the protruding pillars comprise water inlet protruding pillars and water outlet protruding pillars, the water inlet protruding pillar extends into the groove in which the first water inlet channel is located, and the water outlet protruding pillar extends into the groove in which the first water outlet channel is located; and
the water retaining channels comprise a second water inlet channel and a second water outlet channel, the water retaining member water inlets-outlets comprise a first water inlet that communicates with the second water inlet channel and a first water outlet that communicates with the second water outlet channel, the first water inlet is disposed in a top end of the water inlet protruding pillar, and the first water outlet is disposed in a top end of the water outlet protruding pillar.

16. The filter cartridge device according to claim 15, wherein the water retaining member docking ports comprise a second water inlet that communicates with the second water inlet channel and a second water outlet that communicates with the second water outlet channel;
the water dividing channels comprise a third water inlet channel and a third water outlet channel;
and the water retaining member docking ports comprise a third water inlet that communicates with the third water inlet channel and a third water outlet that communicates with the third water outlet channel; and
the water dividing member and the water retaining member control docking and undocking between the third water inlet and the second water inlet and between the third water outlet and the second water outlet through relative rotation, so that the third water inlet channel and the second water inlet channel are connected or disconnected, as well as the third water outlet channel and the second water outlet channel are connected or disconnected.

17. The filter cartridge device according to claim 16, wherein the filter channels comprise a fourth water inlet channel and a fourth water outlet channel; the fourth water inlet channel is formed between the inner side wall of the housing and an outer side wall of the filter medium; a central pipe is disposed inside the filter medium penetrating from one end to the other end of the filter medium, and the central pipe is the fourth water outlet channel; and overflow holes are disposed in a wall of the central pipe.

18. The filter cartridge device according to claim 17, wherein the water dividing member water inlets-outlets comprise a fourth water inlet that connects the fourth water inlet channel and the third water inlet channel and a fourth water outlet that connects the fourth water outlet channel and the third water outlet channel; the fourth water inlet is disposed in a side wall of the connecting rod; a fixing shaft inserted into the central pipe is disposed on an end of the water dividing member away from the water retaining member; and the fourth water outlet is disposed in an end of the fixing shaft away from the water dividing member.

19. The filter cartridge device according to claim 18, wherein the base channels further comprise a first discharging channel; the protruding pillars further comprise a discharging protruding pillar; the discharging protruding pillar extends into the groove in which the first discharging channel is located; the water retaining channels further comprise a second discharging channel; the water retaining member water inlets-outlets further comprises a first discharging outlet that communicates with the second discharging channel, and the first discharging outlet is disposed in a top end of the discharging protruding pillar;
the water retaining member docking ports further comprise a second discharging outlet that communicates with the second discharging channel; the water dividing channels further comprise a third discharging channel; the water dividing member docking ports further comprise a third discharging outlet that communicates with the third discharging channel; the third discharging outlet and the second discharging outlet are controlled through relative rotation between the water dividing member and the water retaining member to be docked or undocked, so that the third discharging channel and the second discharging channel are connected or disconnected; and
the filter channels further comprise a fourth discharging channel, and the filter medium itself is the fourth discharging channel; the water dividing member water inlets-outlets further comprise a fourth discharging outlet that connects the fourth discharging channel and the third discharging channel, and the fourth discharging outlet is disposed in an end of the fixing shaft connected to the water dividing member.

20. The filter cartridge device according to claim 1, wherein locking protrusions are disposed on an edge of the water dividing member, position-limiting slots corresponding to the locking protrusions are disposed in an inner side wall of the housing, and the locking protrusions and the position-limiting slots constitute a fixing position-limiting structure.

21. The filter cartridge device according to claim 20, wherein there are at least two locking protrusions, and the at least two locking protrusions are evenly distributed along a circumferential direction of the water dividing member; and the position-limiting slots have the same quantity as the locking protrusions and correspond to the locking protrusions one to one.

22. The filter cartridge device according to claim 21, wherein at least two of the locking protrusions have different sizes.

23. The filter cartridge device according to claim 1, wherein a second opening that communicates with the filter cavity is disposed in a second end of the housing, and the second opening is covered with an end cap.

* * * * *